US006842984B1

(12) United States Patent
Grant et al.

(10) Patent No.: US 6,842,984 B1
(45) Date of Patent: Jan. 18, 2005

(54) GRASS TRIMMER CUTTING LINE

(75) Inventors: Richard O. Grant, deceased, late of Ebony, VA (US); by Mary Ann Johnson, legal representative, Ebony, VA (US)

(73) Assignee: Weed Tiger, Inc., Ebony, VA (US)

( * ) Notice: Subject to any disclaimer, the term of this patent is extended or adjusted under 35 U.S.C. 154(b) by 0 days.

(21) Appl. No.: 09/706,844

(22) Filed: Nov. 7, 2000

(51) Int. Cl.[7] .............................. B26B 7/00; B26B 9/00; A01D 34/00
(52) U.S. Cl. ........................... 30/276; 30/347; 56/12.5; 56/12.7
(58) Field of Search ................... 30/347, 276; 56/12.5, 56/12.7; 439/877, 421, 878, 882; D8/8

(56) References Cited

U.S. PATENT DOCUMENTS

| | | | | |
|---|---|---|---|---|
| 301,819 A | * | 7/1884 | Jones ........................ | 439/877 |
| 663,489 A | * | 12/1900 | Cleveland .................. | 439/877 |
| 1,949,601 A | * | 3/1934 | Burd .......................... | 439/877 |
| 2,499,296 A | * | 2/1950 | Buchanan .................. | 439/877 |
| 2,618,684 A | * | 11/1952 | Bergan ....................... | 174/87 |
| 2,872,505 A | * | 2/1959 | Ustin ......................... | 174/87 |
| 3,140,142 A | * | 7/1964 | Marquis ..................... | 439/877 |
| 3,900,071 A | * | 8/1975 | Crawford ................... | 83/666 |
| 4,009,927 A | * | 3/1977 | Knowles ..................... | 439/877 |
| 4,065,913 A | * | 1/1978 | Fisher et al. ................ | 56/295 |
| 4,068,376 A | * | 1/1978 | Briar .......................... | 30/276 |
| 4,086,700 A | * | 5/1978 | Inada ......................... | 30/276 |
| 4,097,991 A | * | 7/1978 | Proulx ........................ | 30/276 |
| 4,110,904 A | * | 9/1978 | Johnson ..................... | 439/877 |
| 4,118,865 A | * | 10/1978 | Jacyno et al. ............... | 172/15 |
| 4,126,991 A | * | 11/1978 | Gobin et al. ................ | 56/12.7 |
| 4,145,809 A | * | 3/1979 | Proulx ........................ | 30/276 |
| 4,193,190 A | * | 3/1980 | Wood ......................... | 30/276 |
| 4,250,621 A | * | 2/1981 | Houle ......................... | 30/347 |
| 4,290,257 A | * | 9/1981 | Frantello .................... | 30/276 |
| 4,461,138 A | * | 7/1984 | Whitman .................... | 30/347 |
| 4,571,831 A | * | 2/1986 | White, III ................... | 30/276 |
| 5,023,998 A | * | 6/1991 | Masciarella et al. ........ | 30/276 |
| 5,271,156 A | * | 12/1993 | Hult et al. .................. | 30/276 |
| 5,276,969 A | * | 1/1994 | Luick ......................... | 30/276 |
| 5,303,476 A | * | 4/1994 | Tuggle ....................... | 30/347 |
| 5,316,506 A | * | 5/1994 | Ito ............................. | 439/877 |
| 5,406,708 A | * | 4/1995 | Stephens et al. ............ | 30/276 |
| 5,463,815 A | * | 11/1995 | Fogle .......................... | 30/276 |
| 5,496,968 A | * | 3/1996 | Katoh et al. ................ | 174/74 R |
| 5,519,170 A | * | 5/1996 | Nabeshima ................ | 174/74 R |
| 5,615,543 A | * | 4/1997 | Caffey et al. ............... | 30/276 |
| 5,649,413 A | * | 7/1997 | Oostendorp ................. | 172/15 |
| 5,768,867 A | * | 6/1998 | Carlsen ...................... | 30/276 |
| 5,887,348 A | * | 3/1999 | Iacona et al. ............... | 30/276 |
| 5,907,947 A | * | 6/1999 | Poole et al. ................. | 56/12.7 |
| 6,010,407 A | * | 1/2000 | Ishikawa .................... | 30/276 |
| 6,032,442 A | * | 3/2000 | Paolo ......................... | 30/276 |
| 6,061,914 A | * | 5/2000 | Legrand ..................... | 264/176.1 |
| 6,148,523 A | * | 11/2000 | Everts et al. ................ | 30/276 |
| 6,158,129 A | * | 12/2000 | Klein ......................... | 30/276 |
| 6,301,788 B1 | * | 10/2001 | Webster ...................... | 30/276 |
| 6,324,764 B1 | * | 12/2001 | Watkins ...................... | 30/347 |
| 6,434,837 B1 | * | 8/2002 | Fogle .......................... | 30/347 |
| 6,519,857 B1 | * | 2/2003 | Proulx et al. ............... | 30/276 |

\* cited by examiner

*Primary Examiner*—Allan N. Shoap
*Assistant Examiner*—Jason Prone
(74) *Attorney, Agent, or Firm*—Lieberman & Brandsdorfer, LLC

(57) ABSTRACT

A spooless trimmer head which utilizes finite lengths of trimmer line inserted through apertures in the trimmer head housing. The lines are thick, strong, long lasting and easily replaced when worn. One end of each line extends from the trimmer head to rotate and cut vegetation. The line includes a collar having a flange formed on an opposite end to retain a distal end of the line in the trimmer head housing. The line is crimped to the collar approximately ⅓ the distance from the collar to the distal end of the line. The crimping location in combination with the position of the flange of the collar reduce the stress and strain on the trimmer line and enhance the longevity of the line.

14 Claims, 6 Drawing Sheets

GRASS TRIMMER CUTTING LINE

BACKGROUND OF THE INVENTION

The present invention relates to grass trimmers which use cutting lines. More specifically, the present invention relates to the configuration of the trimmer line and means of attachment of the trimmer line to the grass trimmer.

Standard trimmer line for a grass trimmer is wound around a spool within a trimmer head housing, such as illustrated in U.S. Pat. No. 5,623,765. The line is dispensed from the housing through one or more holes in the housing. A length of line extends from the housing and is spun by the trimmer at a high speed to cut grass or other vegetation. As the vegetation is trimmed, the line wears and shortens. Additional line is dispensed from the housing to restore the exposed line to the desired length for trimming. The mechanism for dispensing includes a spool within the housing which must rotate to unwind additional line and must then lock in placed to permit trimming. Because of the requirements of high speed rotation, spooling and dispensing, trimmers often have complicated head mechanisms. Accordingly, it is inconvenient and difficult to replace a coil of line on a trimmer head mechanism.

The structure of the spool and head mechanism has prevented the use of trimmer lines above a certain diameter. As the diameter of the trimmer line increase, it becomes stiffer and less flexible. The inflexibility of the line impedes its ability to be wrapped around a spool and hinders the ability to smoothly dispense the line from the spool during use. Therefore, a smaller diameter line will wrap and dispense more easily from a spool on a standard trimmer. Also a flexible, softer line will wind and dispense more easily from a coiled line trimmer than a stiffer harder line of the same diameter.

Unfortunately, the diameter and flexibility of the trimmer line directly impacts the wearing of the line. The smaller the diameter line, the faster the wear. The softer and more flexible the line, the faster the wear. A faster wear of the line is synonymous with a greater expense and inconvenience associated with the operation of a grass trimmer. The faster wear of the line results in more frequent need for replacement of the line and the spool, and eventual replacement of the head mechanism.

Several attempts have been made to provide a trimmer with a non-spooled trimming string, including U.S. Pat. No. 4,411,069 for a spooless string trimmer head to Close et al., U.S. Pat. No. 5,433,006 for a mowing apparatus to Taguchi, U.S. Pat. No. 5,406,708 for flexible rotating vegetation cutter to Stephens, U.S. Pat. No. 5,430,943 for a unitary cutting attachment for vegetation cutting devices to Lee, U.S. Pat. No. 5,303,476 for a line head for a rotary line trimmer to Tuggle, and U.S. Pat. No. 5,493,785 for a rotary grass cutting head to Lawrence.

It can also be desirable to use a trimmer line with a non-circular cross section, such as that illustrated in U.S. Pat. No. 5,463,815 for a ribbed flexible cutting line to Fogle. The use of a non-circular cross section can add strength and provide a sharper or cleaner cut of the grass. Unfortunately, such non-circular cross sections can also impede the dispensing of the line from a spool, especially if the line is of thick diameter. Accordingly, what is desirable is a non-circular cross section trimmer line which will overcome dispensing difficulties found in the prior art.

SUMMARY OF THE INVENTION

It is therefore an object of the present invention to provide a non-spooled trimmer line capable of being secured to a housing of a standard vegetation trimmer. It is a further object of the present invention to provide a large diameter non-spooled finite line capable of being secured to a housing of a standard vegetation trimmer. It is an even further object of the present invention to provide a non-spooled trimmer line with a non-circular cross section. It is another object of the invention to provide easily replaceable trimmer line segments. It is a further object of the present invention to teach a retrofit method for modification of a prior trimmer head to accommodate the line pieces of the present invention. Other objects of the invention include a finite line for a vegetation trimmer which avoid the complexities of a spool and head mechanism, allows for the utilization of a large diameter trimmer line, reduces the problems of wear, eliminates misfeed and line bulk, and significantly reduces the cost associated with manufacture and operation of a string line trimmer.

In modifying a conventional vegetation trimmer with the trimmer line disclosed herein, the spool of the trimmer string is removed from the housing of a trimmer head. One or more holes are drilled in the housing to accommodate the novel trimmer line pieces. A trimmer line piece is inserted into each hole from the interior of the housing so that the trimmer line extends from the housing in an outward direction. The trimmer line extends out from the housing and is held in place by a collar mounted near a distal end of the trimmer line. Accordingly, during use the centrifugal force upon the trimmer line in combination with the collar holds the trimmer line piece in place and the collar prevents the trimmer line piece from exiting the housing.

Other features and advantages of this invention will become apparent from the following detailed description of the presently preferred embodiment of the invention, taken in conjunction with the accompanying drawings.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EXEMPLARY EMBODIMENTS

Figure 1:
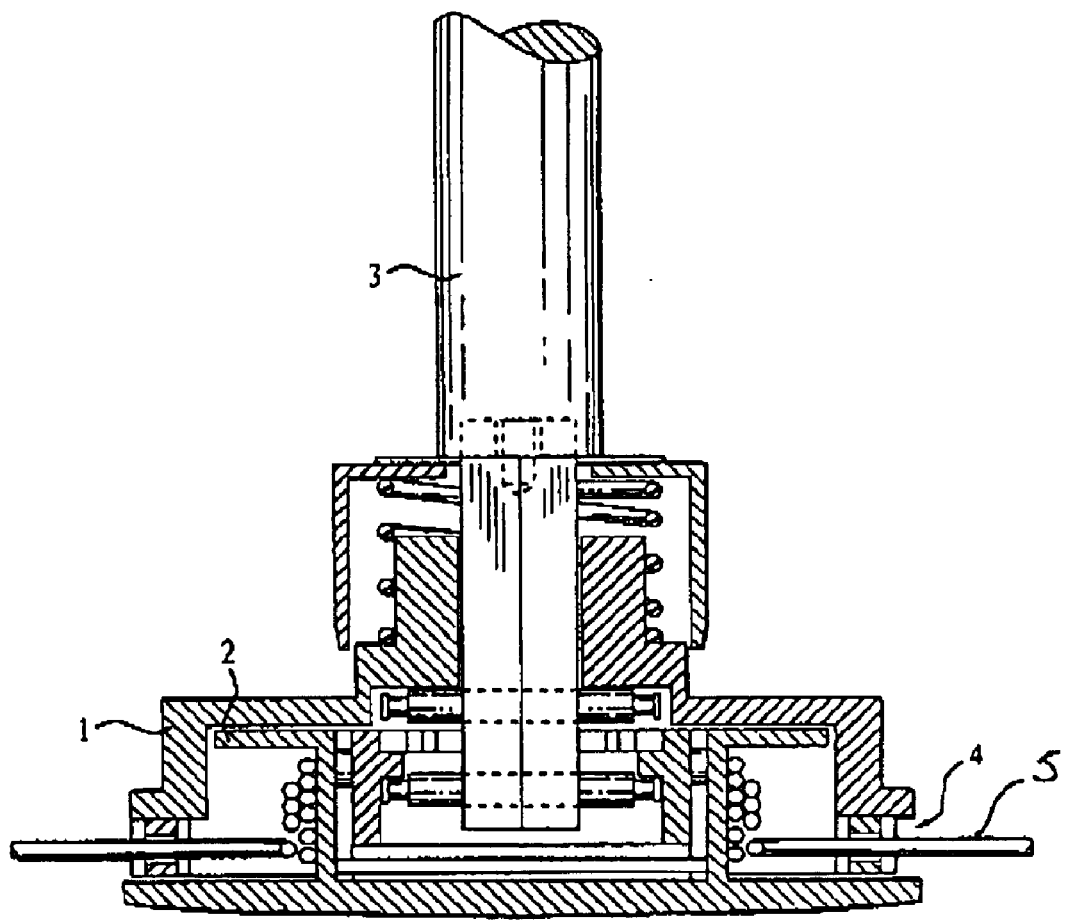
FIG. 1 is a perspective view of a prior art string trimmer head.

FIG. 1 is an illustration of a prior art standard trimmer head, showing a number of parts, including a housing 1, a spool 2 and a shaft 3. The housing 1 includes a number of holes 4 for accommodating the string 5 as it extends from spool 2.

Figure 2:
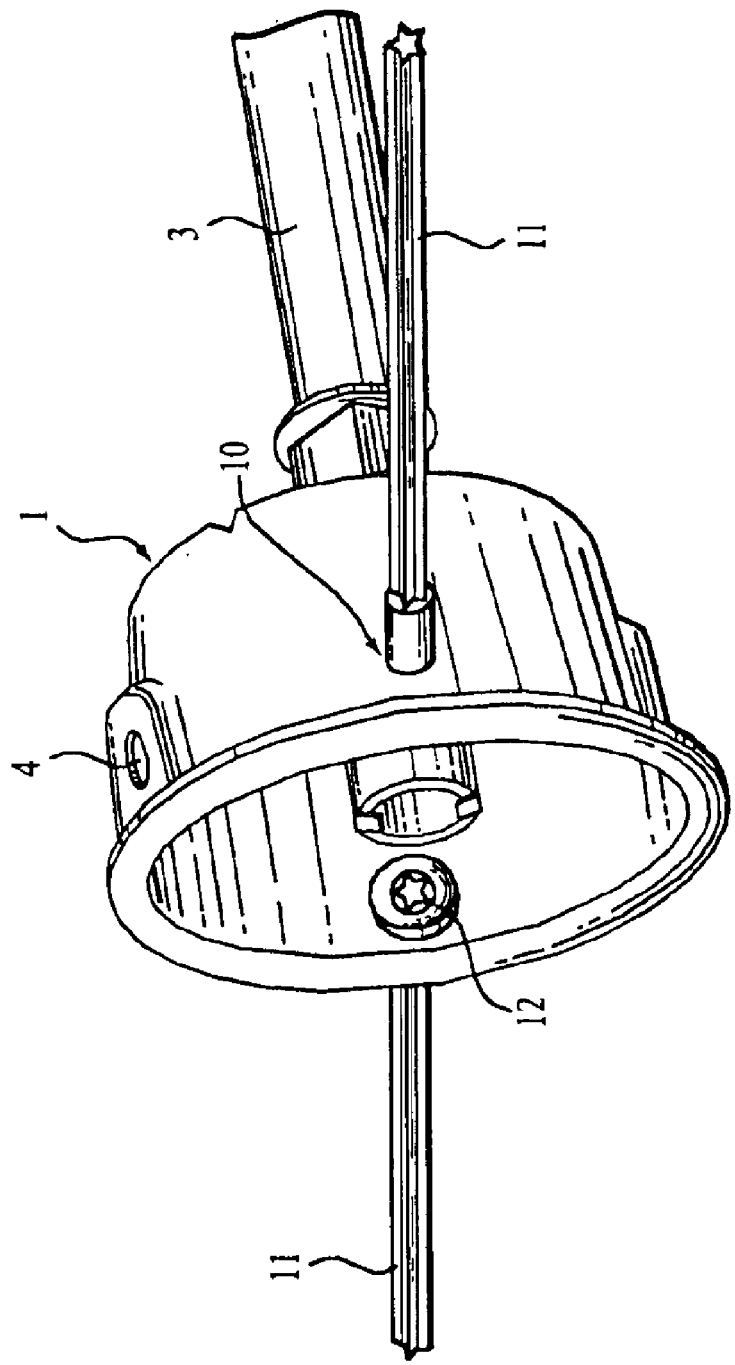
FIG. 2 is a perspective view of an exemplary embodiment of the present invention.
Figure 3A:
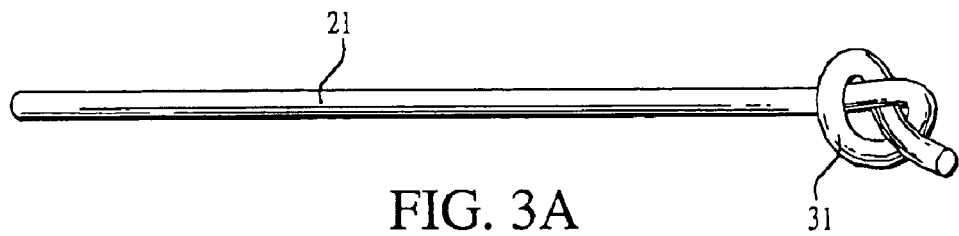
FIG. 3 illustrates six exemplary embodiments of the line pieces of the present invention.
Figure 3B:
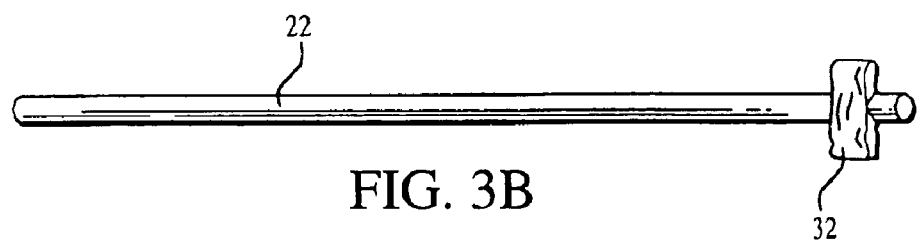
Figure 3C:
Figure 3D:
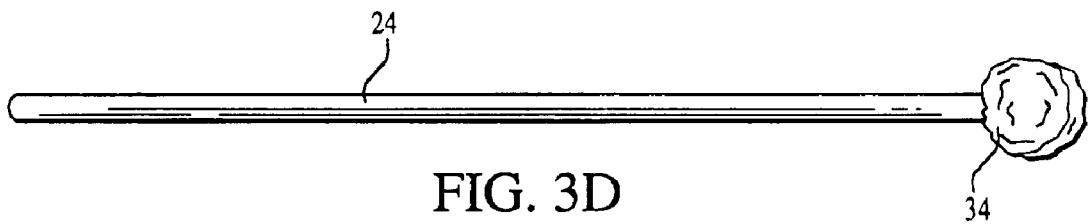
Figure 3E:
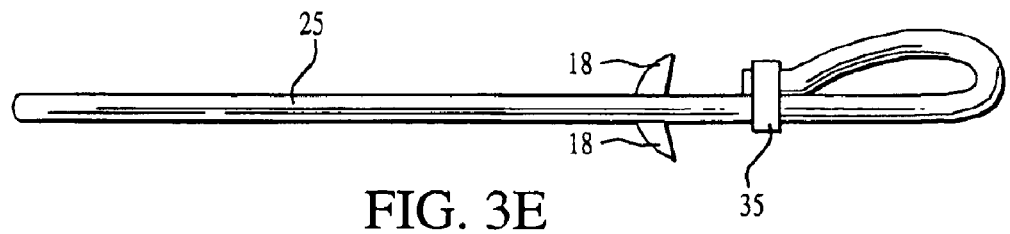
Figure 3F:
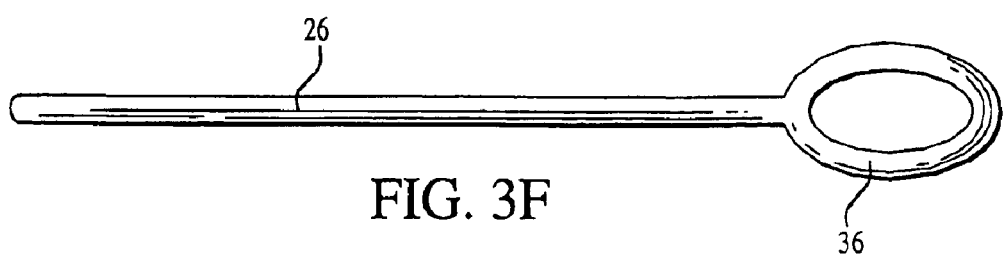

The trimmer of the present invention, as illustrated in FIG. 2, eliminates the spool commonly associated with the prior art vegetation trimmers. The trimmer housing 1 can be a new piece designed to accommodate the trimmer line 11 of the present invention and adapted to attach to the shaft 3 of the trimmer. Alternatively, the housing 1 can be adapted from the standard housing 1 illustrated in FIG. 1. The trimmer line pieces 11 of the present invention can be inserted through the original line holes 4 or the housing can be provided with one or more additional holes 10 about its periphery. The additional holes 10 may be of the same or of larger diameter to accommodate the increase diameter of the trimmer line 11 of the present invention. In an alternative embodiment, the original holes 4 can be enlarged to accommodate the trimmer line pieces 11 of the present invention if necessary.

One or more sections of trimmer line 11 of a predetermined length is fed through each hole 10. Each line section 11 has a stopper 12 on one end to hold the line 11 in the hole 10 while the trimmer housing 1 is spinning. Matching of the hole and line diameter to create a snug fit prevents the line segments from backing out of the holes when the trimmer head is not spinning.

Because the complex feed mechanism is eliminated, a much thicker line can be implemented, reducing wear of the trimmer line during use. In the event of wear and shortening of the line below a desired length, exchanging the line for a new section is easily accomplished without tools or disassembly of any mechanism. An optional cover can be placed on the head to prevent loss of string when the trimmer is stored or otherwise not operated. Optionally, a piece of tape or other adhesive can be used to prevent the line sections from breaking out of the holes when the trimmer head is not spinning.

Figure 6:
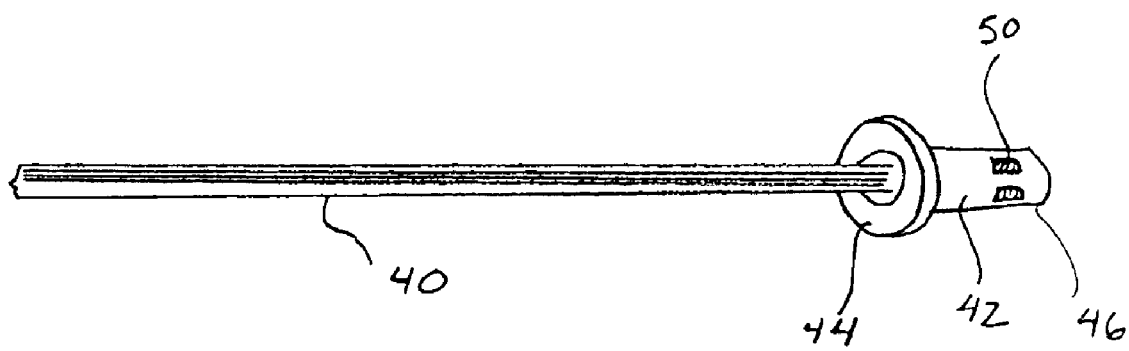
FIG. 6 is an illustration of a trimmer line piece according to the preferred embodiment of this invention, and is suggested for printing on the first page of the issued patent.

In a preferred embodiment, the trimmer line 40 as illustrated in FIG. 6 has a collar 42 with a flange 44. The collar 42 is secured to a distal end 46 of the line 40, such that the distal end 46 of the line is flush with a distal end of the collar 42. However, the flange 44 is located at a proximal end of the collar The collar is secured to the trimmer line through a crimp, which forms an indentation 50 into the trimmer line. The crimp is located approximately ⅓ the distance from the distal end of the collar and the trimmer line. The combination of the placement of the crimp in conjunction with the location of the flange with respect to the collar reduces the stress and strain an the trimmer line, thereby preventing premature breakage, or any breakage of the trimmer line. In addition, the stopper is preferably comprised of a metallic material such as a bass, but may be comprised of alternative materials providing an equivalent desired affect for holding the distal end of the monofilament within an interior section of the housing. Accordingly, the flange 44 of the collar 42 is designed to hold a finite length of trimmer line in place with respect to the housing and to enhance the longevity of the trimmer line.

FIG. 3 illustrates six exemplary trimmer line sections 21, 22, 23, 24, 25, and 26. Line piece 21 has a knot 31 for a stopper. Line piece 22 has a plastic clip 32 for a stopper. Line piece 23 has a metal clip 33 for a stopper. Line piece 24 has a melted tip 34 for a stopper. Line piece 25 has a clipped loop 35 for a stopper. Line piece 26 has a formed loop 36 for a stopper. The stopper 12 can also be formed by dipping the end of line 10 in a substance which will form an enlarged end, such as epoxy, melted plastic or glue. These exemplary embodiments of ways to form a stopper 12 on the inner end of a trimmer line piece in accordance with the teachings of the present invention. In a preferred embodiment, the trimmer line is a finite length of a monofilament plastic material. The monofilament preferably comprises a non-circular cross-section for enhancing the trimming abilities. Accordingly, each trimmer line 21–26 illustrate alternative configurations of the finite trimmer length in conjunction with a stopper.

Figure 4:
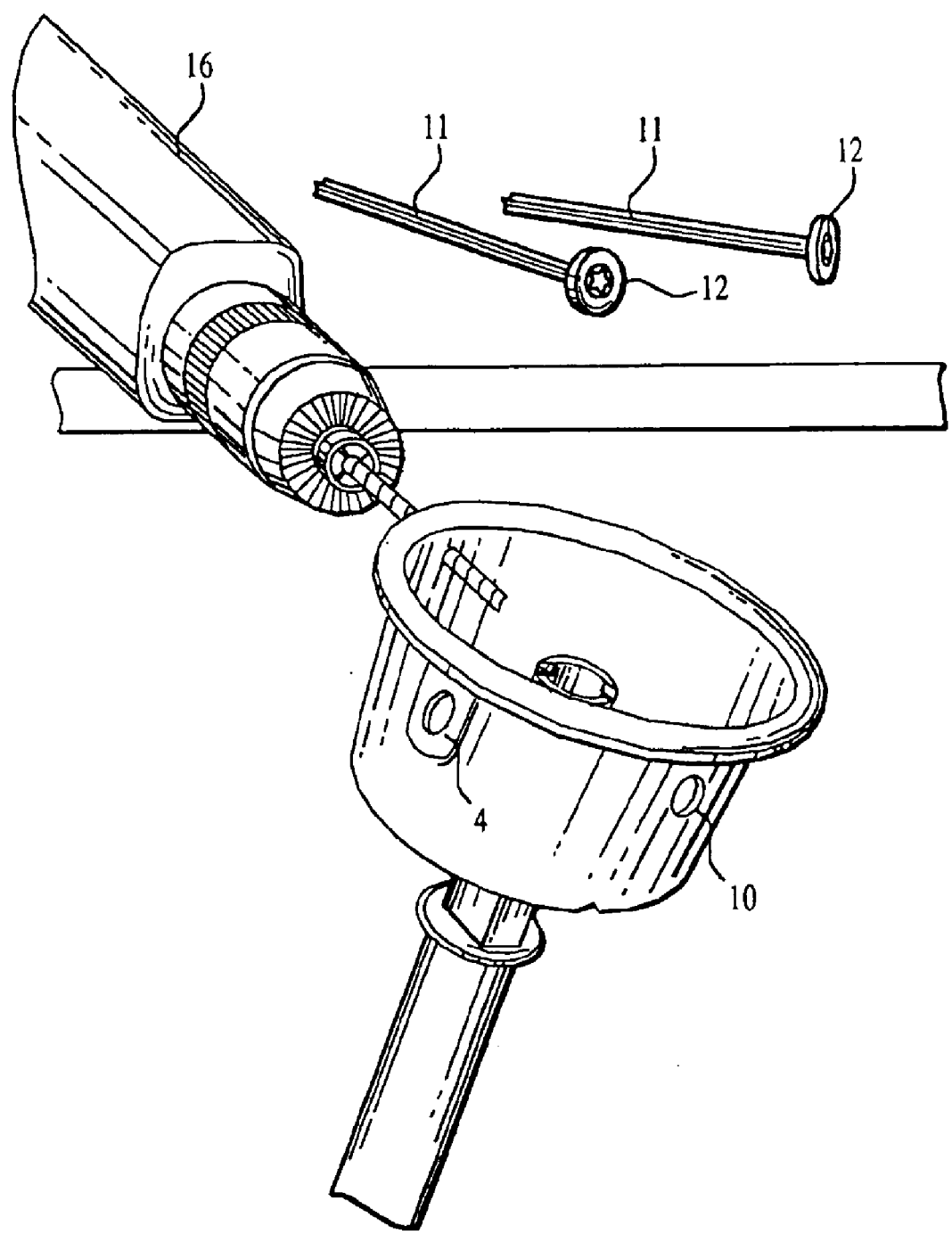
FIGS. 4 and 5 illustrate a method for retrofitting the present invention to standard trimmer line housings.
Figure 5:
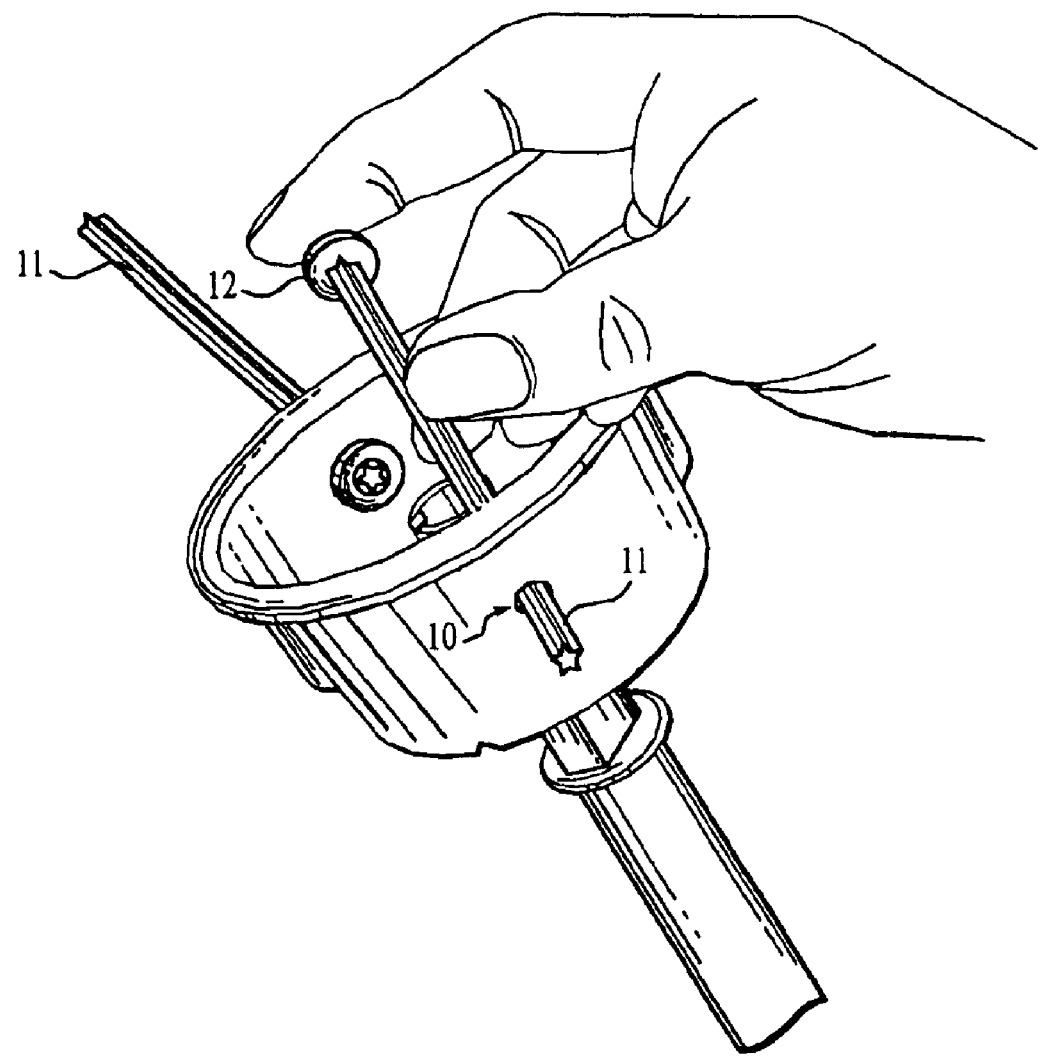

FIGS. 4 and 5 illustrate the method for modification of a trimmer head to accommodate the trimmer line segments 11 of the present invention. The spool 2 is removed from the housing 1 and discarded. A drill 16 is used to either enlarge original holes 4 or to add additional holes 10 to accommodate the string pieces 11. The string pieces are then inserted through the holes 10 with the stopper 12 on the internal side of the housing 1. Adhesive or tape can be used to secure the line 11 within the hole 10 if desired. Alternatively, the line pieces can be made with spurs 18, FIG. 3, which pass through the holes 10 and impede the line piece from backing out of the hole 10. Spurs 18 can be incorporated into any of the line piece configurations. Accordingly, the stopper 12, flange 44 or spurs 18, or combinations thereof, are necessary for holding the trimmer line in the housing.

In forming the apertures 10 in the housing or using existing apertures, the cross section of the trimmer line is designed to be less than the size of the aperture. The trimmer line is placed through the aperture with the flange resting on an interior wall of the housing. During use, the shaft spins the trimmer lines in a clockwise or counterclockwise direction. The centrifugal force associated with the spinning holds the trimmer line in place and holds the flange against an interior wall of the housing. Furthermore, the factor of the cross section of the filament being less than the size of the aperture produces a hinge effect to the trimmer line and functions to prevent breaking of the line. Accordingly, the size and dimensions of the trimmer line with respect to the aperture contribute to the longevity of the trimmer line.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. A trimmer line comprising:
   an elongate monofilament having a proximal end and a distal end;
   a collar secured to said distal end of said monofilament, wherein said collar has a hollow interior section adapted to receive said monofilament;
   said collar comprises a proximal end and a distal end;
   said distal end of said collar is flush with said distal end of said monofilament and said proximal end of said collar is adapted to extend toward said proximal end of said monofilament;
   said proximal end of said collar comprises a flange;
   said flange and said collar are a single concentric unit;
   said flange includes an external diameter greater than an external diameter of said collar;
   said flange is adapted to place said monofilament adjacent to an aperture in a trimming apparatus; and
   said distal end of said collar encircles a portion of said monofilament extending from said flange to said distal end of said collar.

2. The trimmer line of claim 1, wherein said collar comprises a hollow circular cross-section adapted to extend from said distal end of said monofilament to said flange.

3. The trimmer line of claim 1, wherein said collar is crimped to said monofilament.

4. The trimmer line of claim 3, wherein said crimp forms an indentation into said monofilament forward of said distal end.

5. The trimmer line of claim 4, wherein placement and position of said collar and said crimp is adapted to reduce stress and strain on said monofilament and to prevent premature breakage of said monofilament from said collar.

6. A trimmer line for a trimmer comprising:
   said trimmer comprising a cutting head having a housing with a first end adapted to be mounted to a drive shaft, and a second end having an elongated annular flange and an aperture in said flange extending from an interior wall to an exterior wall;
   said trimmer line comprising a finite monofilament length comprising a proximal end and a distal end;
   a collar mounted to said distal end of said monofilament;
   said collar comprising a proximal end and a distal end, said distal end of said collar is adapted to be flush with said distal end of said monofilament, and said proximal end of said collar comprising a flange;
   said flange and said collar are a single concentric unit;
   said flange includes an external diameter greater than an external diameter of said collar; and
   said flange of said collar comprising a distal end and a proximal end, wherein said proximal end of said flange is adapted to be placed in communication with said interior wall of said aperture of said cutting head flange.

7. The trimmer line of claim 6, wherein a portion of said monofilament extending from said distal end of said collar to said flange mests within said interior wall of said cutting head.

8. The trimmer line of claim 6, wherein said monofilament further comprises a spur mounted between said flange and said proximal end of said monofilament.

9. The trimmer line of claim 6, wherein said collar is comprised of a metallic material.

10. The trimmer line of claim 9, wherein said metallic material is brass.

11. The trimmer line of claim 6, wherein said collar is within said interior wall of said cutting head.

12. The trimmer line or claim 11, wherein said collar comprises a crimp adapted to secure said collar to said monofilament.

13. The trimmer line of claim 12, wherein said crimp forms an indentation into said monofilament.

14. The trimmer line of claim 12, wherein positioning of said collar and said crimp is adapted to reduce stress and strain on said monofilament and is adapted to prevent breakage of said monofilament from said collar.

* * * * *

UNITED STATES PATENT AND TRADEMARK OFFICE
CERTIFICATE OF CORRECTION

PATENT NO. : 6,842,984 B1
DATED : January 18, 2005
INVENTOR(S) : Grant et al.

It is certified that error appears in the above-identified patent and that said Letters Patent is hereby corrected as shown below:

Column 6,
Line 3, should read "to said flange rests within said interior wall of said cutting"

Signed and Sealed this

Third Day of May, 2005

JON W. DUDAS
*Director of the United States Patent and Trademark Office*